United States Patent
Katayama et al.

(10) Patent No.: US 7,692,333 B2
(45) Date of Patent: *Apr. 6, 2010

(54) ADJUSTABLE SPEED DRIVE SYSTEM FOR PRIMARY LOOP RECIRCULATION PUMP

(75) Inventors: Yukihiro Katayama, Hitachi (JP);
Masashi Sugiyama, Hitachi (JP);
Shunya Morita, Hitachi (JP); Hirohisa Satomi, Hitachi (JP)

(73) Assignee: Hitachi-GE Nuclear Energy, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/210,619

(22) Filed: Sep. 15, 2008

(65) Prior Publication Data

US 2009/0009000 A1    Jan. 8, 2009

Related U.S. Application Data

(63) Continuation of application No. 11/400,211, filed on Apr. 10, 2006, now Pat. No. 7,429,807.

(30) Foreign Application Priority Data

Apr. 11, 2005 (JP) .............................. 2005-112968

(51) Int. Cl.
*H02J 7/00* (2006.01)
*H02J 9/00* (2006.01)

(52) U.S. Cl. ............................ 307/64; 307/43; 376/277
(58) Field of Classification Search .................. 307/43, 307/64; 376/277, 298, 347
See application file for complete search history.

(56) References Cited

U.S. PATENT DOCUMENTS

| 5,610,957 | A | 3/1997 | Tanikawa |
| 5,896,434 | A | 4/1999 | Yoshizumi |
| 6,747,882 | B2 | 6/2004 | Tanaka |

FOREIGN PATENT DOCUMENTS

| JP | 1-203997 | 8/1989 |
| JP | 08-080061 | 3/1996 |

OTHER PUBLICATIONS

U.S. Appl. No. 11/032,289, filed Jan. 10, 2005, Sugiyama.
Office Action issued in Japanese Patent Application No. 2005-112968 on May 18, 2009.

*Primary Examiner*—Albert W Paladini
*Assistant Examiner*—Carlos Amaya
(74) *Attorney, Agent, or Firm*—Antonelli, Terry, Stout & Kraus, LLP.

(57) ABSTRACT

An adjustable speed drive system for a primary loop recirculation pump and method of control in which a first breaker is connected to an auxiliary power supply system, an inverter is connected to the first breaker, a second breaker is connected to an output of the inverter, a gate driver supplies a gate pulse to the inverter, and an inverter control portion drives the gate driver. The adjustable speed drive system is combined with a backup adjustable speed drive system. When a malfunction in a main adjustable speed drive circuit portion including the inverter and the gate driver in the adjustable speed drive system used in a normal operation is detected, the main adjustable speed drive circuit portion is switched to the backup adjustable speed drive system, and an operation of a recirculation pump motor for driving a recirculation pump that controls a flow of a reactor core is continued.

6 Claims, 8 Drawing Sheets

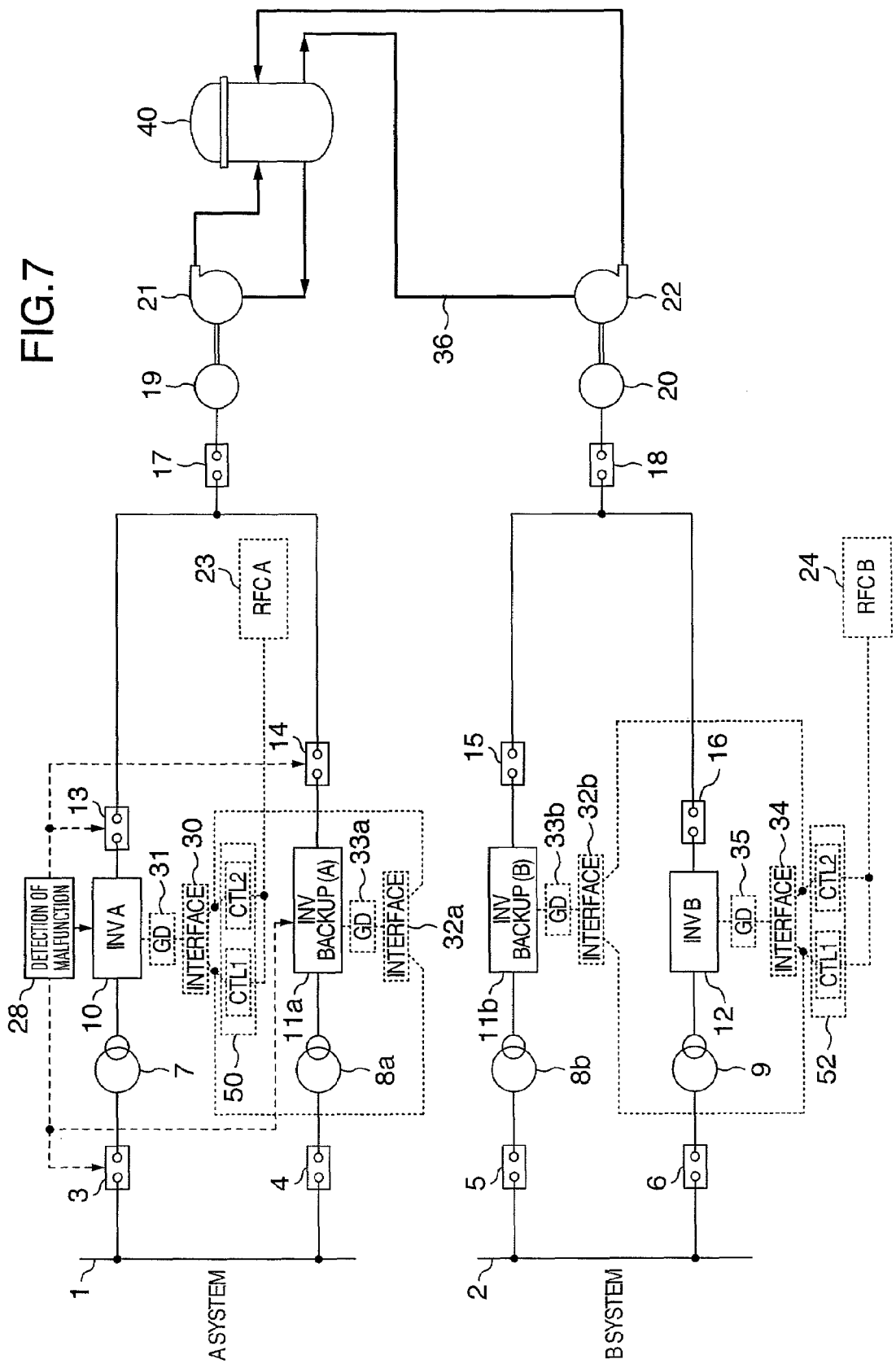

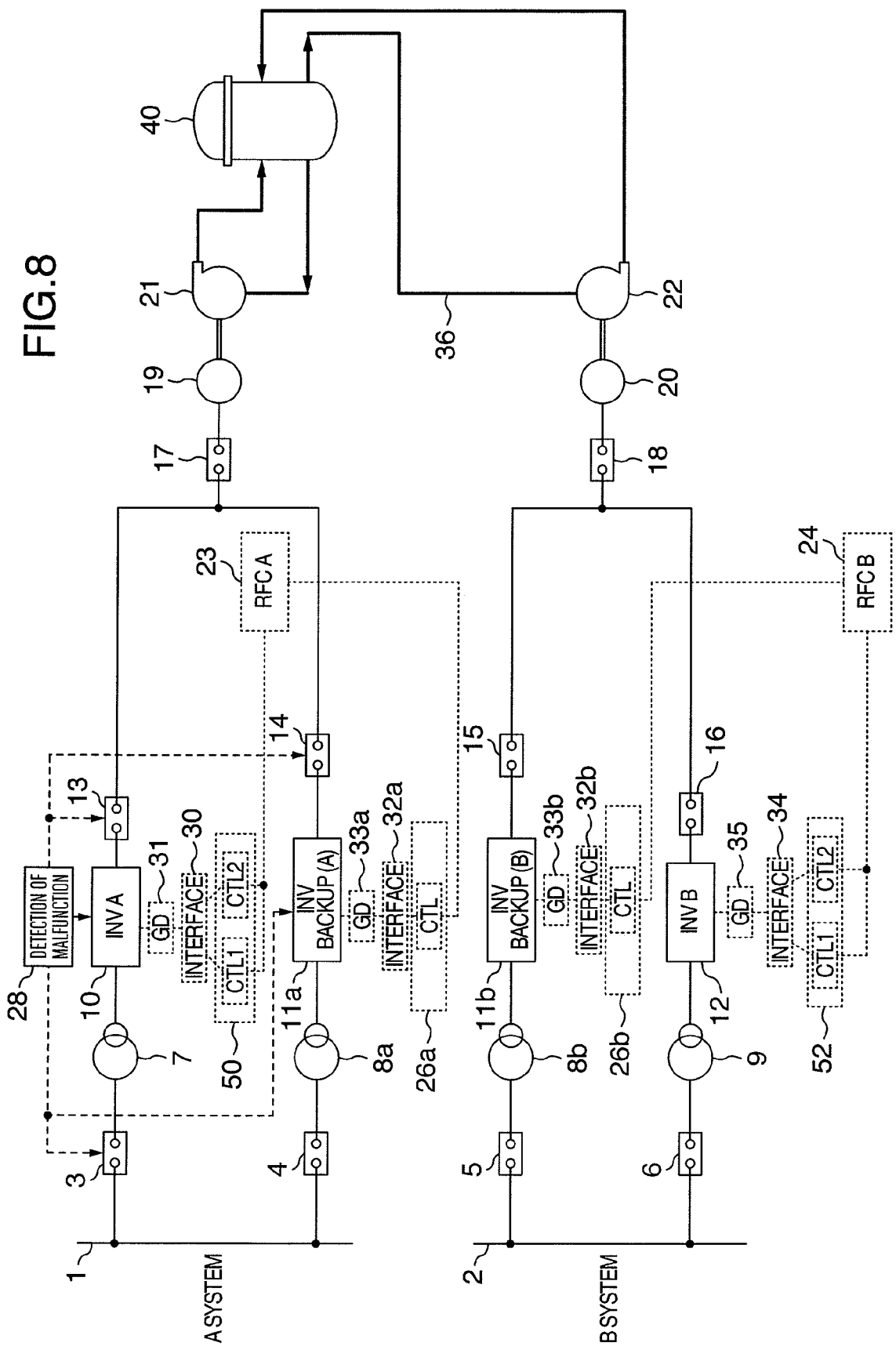

ADJUSTABLE SPEED DRIVE SYSTEM FOR PRIMARY LOOP RECIRCULATION PUMP

CROSS-REFERENCE TO RELATED APPLICATIONS

This application is a continuation application of U.S. application Ser. No. 11/400,211, filed Apr. 10, 2006, now U.S. Pat. No. 7,429,807 the contents of which is incorporated herein by reference.

This application relates to subject matter described in the patent application Ser. No. 11/032,289 (claiming the priority from Japanese patent application No. 2004-9974 filed on Jan. 19, 2004) filed on Jan. 10, 2005, entitled "NUCLEAR POWER PLANT, METHOD OF REPLACEMENT IN THE SAME AND METHOD OF OPERATING THE SAME," by Masashi SUGIYAMA, Yukihiro KATAYAMA, Kenji TOMINAGA, Hirohisa SATOMI and Ichirou SHIMODA, and assigned to the same assignee of the present application.

BACKGROUND OF THE INVENTION

The present invention relates to an adjustable speed drive system for a primary loop recirculation pump for a nuclear reactor coolant, which is suitable for driving and controlling a primary loop recirculation pump which controls power output of a nuclear reactor of a nuclear power plant.

Conventionally, a flow control of a reactor core has been performed by a primary loop recirculation pump (a PLR pump) in order to control a nuclear reactor power output. In a BWR (stands for Boiling-Water Reactor) plant, the power output control of the nuclear reactor has been performed by employing PLR pumps in the two system configuration, and an MG set has been used as its power supply system for variably controlling a rotating speed of a motor which is connected to the primary loop recirculation pump. The MG set is constituted to include an induction motor, which is connected to each of two system of high voltage buses in the plant via an incoming breakers, and rotated by an electric power supplied from the high voltage bus, a variable-speed fluid coupling connected to a rotating shaft of the induction motor, and a generator connected to the variable-speed fluid coupling. The generator has a motor connected thereto via a breaker for tripping a primary loop recirculation pump (hereinafter referred to as RPT breaker), so that an electric power generated by the generator is supplied to the motor via the RPT breaker, and the rotating speed of the generator is controlled by the variable fluid coupling to control electric voltage and frequency supplied to the motor to thereby control the rotating speed of the primary loop recirculation pump so as to eventually control the flow amount of the nuclear reactor coolant.

In the conventional technique using the MG set, when a turbine trip or a load rejection occurs during the plant operation, the MG set is used together with the scram of the nuclear reactor to make shutting down of the RPT beaker and to trip the two PLR pumps so as to rapidly reduce the flow of the reactor core to thereby moderating a transient increase in power output from the nuclear reactor, so that sound performance of the fuel is maintained.

In recent years, by virtue of a development of a power semiconductor device with large capacity, a static variable-frequency power supply (an inverter) using the power semiconductor device, instead of the MG set, came into use. As a result, the conventional MG set has been becoming obsolete, and gradually the static variable-frequency power supply has been instead adopted. JP-A-8-80061 discloses an power supply system for a primary loop recirculation pump adopting a current source inverter.

Compared to the primary loop recirculation pump using the MG set, a power generation plant adopting the inverter power supply system does not require the MG set which consists of an induction motor, a variable-speed fluid coupling, a generator, and an oil system as an auxiliary machinery, therefore, there are some advantages such as enhancement of maintainability, effectiveness during low power output, and linearity of speed control, and the like.

SUMMARY OF THE INVENTION

In the power supply system for the primary loop recirculation pump for the nuclear reactor coolant adopting the current source inverter disclosed in JP-A-8-80061, the current source inverter serves as a current is source on an electric circuit, it is not possible to perform no-load operation by shutting down the output side of the inverter. Therefore, when a trouble such as turbine trip or load rejection occurs in a plant, it has been first tripping an inverter incoming breaker provided between the system and the current source inverter by using an RPT signal from a recirculation pump trip control portion (hereinafter referred to as a RPT control portion), and then stopping the current source inverter by using a stop signal from the inverter control portion in order to stop two PLR pumps.

Furthermore, with the PLR pump, two PLR pumps constituted into two separate systems are employed for performing controlling of the power output of the nuclear reactor. Therefore, in the case that one of the two systems comes into malfunction due to breakage of one of the PLR pumps, generation of the power output from the nuclear plant must be lowered, hence high reliability is required in the power supply of the primary loop recirculation pump. Therefore, the inverter control portion is usually designed to have a redundancy so as not to stop the plant by only one malfunction of the inverter portion. However, a main power gate supply circuit portion which supplies electric power to the PLR pump motors, by including an inverter or an inverter driver for supplying a gate pulse to the inverter, and the like, is formed in a one-fold (i.e., single) configuration.

Since a semiconductor element used for an inverter main circuit, a gate driver, and the like, may lose its function by an accidental malfunction, there is a possibility that one accident leads the adjustable speed drive main circuit portion to be inoperable.

Therefore, it is an object of the present invention to provide an adjustable speed drive for a primary loop recirculation pump which is able to continue the operation of a PLR pump even if a single malfunction occurred in an adjustable speed drive main circuit portion.

It is another object of the present invention to provide an adjustable speed drive for a primary loop recirculation pump which is able to trip a PLR pump rapidly and safely, and to continue the operation of the PLR pump even if a single malfunction or failure occurred in the adjustable speed drive main circuit portion.

To achieve the above objectives, the adjustable speed drive for the primary loop recirculation pump according to the present invention is an adjustable speed drive for a primary loop recirculation pump using an inverter, which includes a backup main adjustable speed drive circuit portion, and a breaker for switching between an incoming destination and an outputting destination of the backup main adjustable speed drive circuit portion. A control signal of an inverter control portion is switched in order to control an inverter included in the backup main adjustable speed drive circuit portion, and thus, even if a single malfunction occurred in the adjustable speed drive main circuit, the primary loop recirculation pump of a nuclear reactor is continuously controlled and operated by switching to the backup main adjustable speed drive circuit portion. Thereby, even if a single malfunction occurred in the main adjustable speed drive portion, it is possible to provide a highly reliable adjustable speed drive for a primary loop recirculation pump.

According to an embodiment of the present invention, the adjustable speed drive for the primary loop recirculation pump includes a backup main adjustable speed drive circuit portion, and a breaker for switching between an incoming destination and an outputting destination of the backup main adjustable speed drive circuit portion, and in order to control an inverter included in the backup adjustable speed drive main circuit portion, a control signal of an inverter control portion is switched. Thus, when a single malfunction occurs in a main adjustable speed drive circuit, switching to the backup adjustable speed drive main circuit portion is performed, the primary loop recirculation pump of a nuclear reactor can be continuously controlled and operated.

Other objects, features and advantages of the invention will become apparent from the following description of the embodiments of the invention taken in conjunction with the accompanying drawings.

BRIEF DESCRIPTION OF THE DRAWINGS

FIG. 7 is a general diagrammatic view illustrating a modified embodiment of the configuration of the adjustable speed drive for the primary loop recirculation pump according to the embodiment shown in FIG. 6.

FIG. 8 is a general diagrammatic view illustrating a modified embodiment of the configuration of the adjustable speed drive for the primary loop recirculation pump according to the embodiment shown in FIG. 6.

DESCRIPTION OF THE EMBODIMENTS

An embodiment of the present invention will be described hereinbelow with reference to FIGS. 1 through 8.

Figure 1:
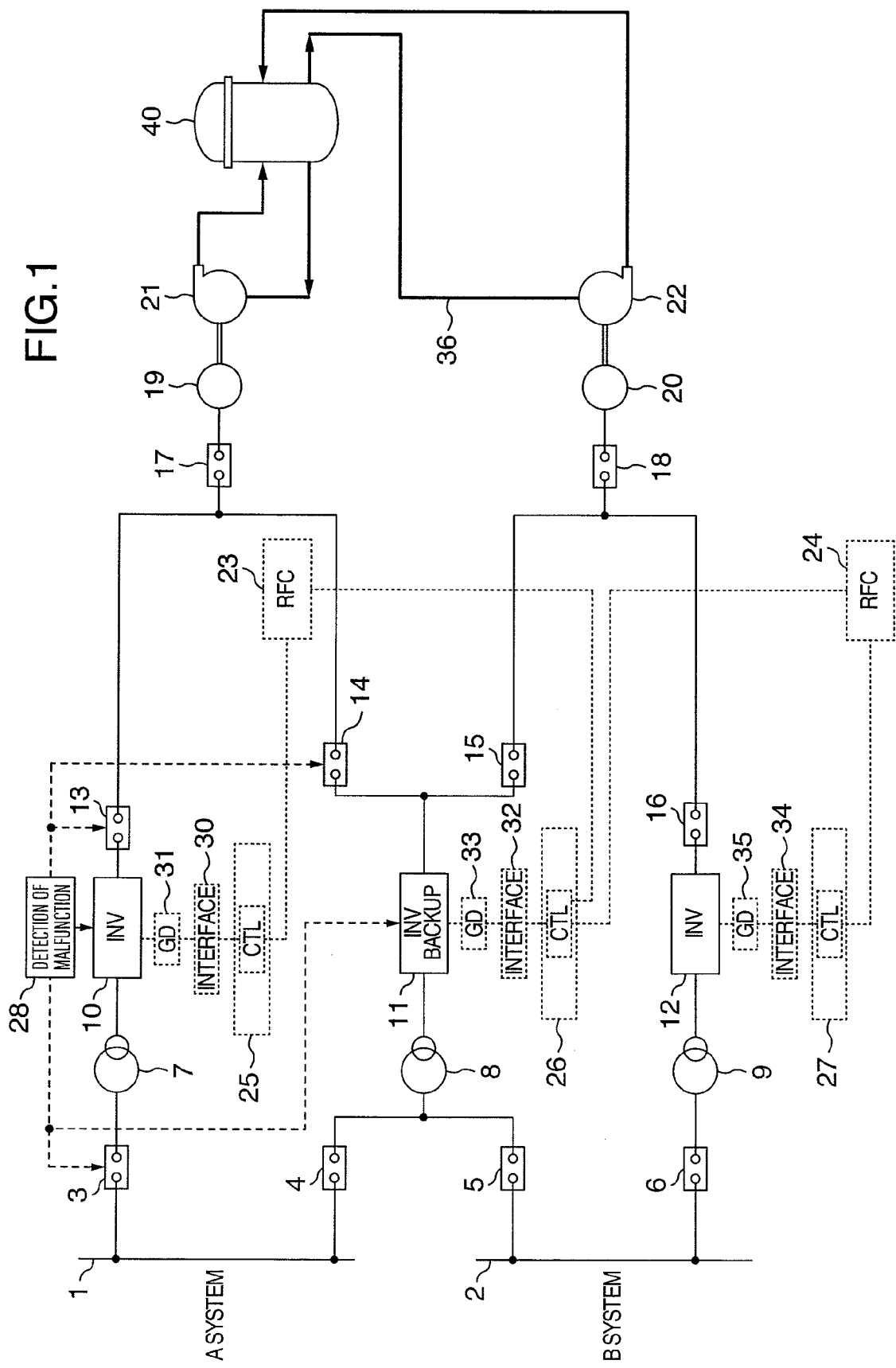
FIG. 1 is a general diagrammatic view illustrating a configuration of an adjustable speed drive for a primary loop recirculation pump according to the embodiment of the present invention.

FIG. 1 is a general diagrammatic view illustrating a configuration of an adjustable speed drive for a primary loop recirculation pump according to the embodiment of the preset invention.

As shown in FIG. 1, a transformer 7 is connected to a high voltage bus 1 of unit auxiliary power supply system via a breaker 3, and a transformer 9 is connected to a high voltage bus 2 via a breaker 6, in a plant. Furthermore, a breaker 4 is connected to the high voltage bus 1, a breaker 5 is connected to the high voltage bus 2, and a transformer 8 is connected to the breaker 4 and the breaker 5. An inverter 10 is connected to the transformer 7, a backup inverter 11 is connected to the transformer 8, and an inverter 12 is connected to the transformer 9. The inverter 10 is connected to an RPT breaker 17 via a breaker 13, and the backup inverter 11 is connected to the RPT breaker 17 via a breaker 14. The RPT breaker 17 is connected to a PLR pump 21 via a PLR pump motor 19. The backup inverter 11 is connected to a RPT breaker 18 via a breaker 15, and the inverter 12 is connected to the RPT breaker 18 via a breaker 16. The RPT breaker 18 is connected to a PLR pump 22 via a PLR pump motor 20. The PLR pumps 21 and 22 are connected to a nuclear reactor 40 via a primary loop piping 36, and a flow of nuclear reactor coolant in the reactor core of a nuclear reactor 40 is controlled by both the PLR pump 21 and the PLR pump 22.

A nuclear reactor recirculation control portion 23 is connected to an inverter control portion 25 and an inverter control portion 26. The inverter control portion 25 is connected to the inverter 10 via an interface 30 and a gate driver 31, and the inverter control portion 26 is connected to the backup inverter 11 via an interface 32 and a gate driver 33. The gate driver 31 is driven by a signal from the inverter control portion 25 to supply a gate pulse to the inverter 10.

A nuclear reactor recirculation control portion 24 is connected to the inverter control portion 26 and an inverter control portion 27. The inverter control portion 27 is connected to the inverter 12 via an interface 34 and a gate driver 35. The gate driver 35 is driven by a signal from the inverter control portion 27 to supply a gate pulse to the inverter 12.

A malfunction detection portion 28 is provided to monitor an operation state of the adjustable speed drive for the primary loop recirculation pump for detecting malfunctions that might occur in the adjustable speed drive. Although not illustrated in FIG. 1, a further malfunction detection portion is provided for an inverter 12, to monitor a state of the operation of the adjustable speed drive system for the primary loop recirculation pump for detecting malfunctions.

In this way, a two-system primary loop recirculation system is configured of the PLR pump 21 and the PLR pump 22. In the normal operation, the breaker 3, the breaker 13 and the RPT breaker 17 are closed to supply electric power from the inverter 10 to the PLR pump motor 19, and further the breaker 6, the breaker 16 and the RPT breaker 18 are closed to supply electric power from the inverter 12 to the RPT pump motor 20. In this instance, the breaker 4 or the breaker 5 is arranged to be closed, and the breaker 14 and the breaker 15 are arranged to be opened and accordingly, any supply of an electric power to the PLR pump motor 19 or the PLR pump motor 20 is not performed. However, the backup inverter 11 is electrically charged and in a standby state. In this instance, if both the breaker 4 and the breaker 5, or both the breaker 14 and the breaker 15 are turned to be simultaneously closed, electric power is supplied to either the PLR pump motor 19 or the PLR pump motor 20 from both the backup inverter 11 and the inverter 10, or the inverter 12. Therefore, an interlock is provided to avoid the both breakers from turning to be closed at the same time. Also, the inverter control portion 26 of the backup inverter 11 is in standby in a state in which the inverter control portion 26 is able to follow the control signal from either the nuclear reactor recirculation control portion 23 or 24.

In this situation, for example, when the malfunction detection portion 28 detects malfunction in the adjustable speed drive main circuit portion for supplying electric power to the PLR pump motor, which is provided with the inverter 10 for supplying electric power to the PLR pump motor 19, the gate driver 31 for supplying a gate pulse to the invert 10, the inverter control portion 25, and the like, the breaker 3 and the breaker 13 are shut down to be opened, and also the inverter 10 is stopped and the breaker 14 is put into its closed state to thereby drive the backup inverter 11, which is in a standby state. Therefore, the inverter for supplying electric power to the PLR pump motor 19 is switched to the backup inverter 11, and the operation of the PLR pump motor 19 is continued.

Upon switching to the backup inverter 11, the breaker 5 is closed, and when electric power is supplied to the backup inverter 11 also from the high voltage bus 2, the high voltage bus 2 also supplies electric power to the inverter 12. In this case, after the inverter is switched to the backup inverter 11 and after the entire operation is stabilized, the breaker 4 is closed, subsequently the breaker 5 is opened, and then the high voltage bus 2 is switched to the high voltage bus 1 so as to achieve supply of the electric power from the high voltage bus 1. Furthermore, if the inverter control portion 26 of the backup inverter 11 is able to follow the control signal from the nuclear reactor recirculation control portion 24 during the standby state thereof, when the operation has been stabilized, the inverter control portion 26 will be switched to control the backup inverter 11 according to the control signal from the nuclear reactor recirculation control portion 23.

Furthermore, if a malfunction or failure occurs in the adjustable speed drive main circuit portion for the inverter 12 supplying electric power to the PLR pump motor 20, the malfunction detection portion detects the malfunction, and the breaker 6 and the breaker 16 are shut down to be opened. Then, the inverter 20 is stopped, the backup inverter 11 is activated, and the breaker 15 is turned to be closed, so that the adjustable speed drive main circuit portion causing the malfunction is switched to the backup adjustable speed drive main circuit portion to be able to continue the operation of the PLR pump motor 20. Furthermore, like the case described above, if the breaker 4 is closed, and electric power is supplied from the high voltage bus 1 to the backup inverter 11, after the inverter is switched to the backup inverter 11 and the operation is stabilized, the breaker 5 is closed, subsequently the breaker 4 is shut down to be switched to its opened state. Furthermore, if the inverter control portion 26 of the backup inverter 11 is able to follow the control signal from the nuclear reactor recirculation control portion 23 during the standby state of the inverter control portion 26, after the operation is stabilized, the inverter control portion 26 will be switched to control the backup inverter 11 according to the control signal from the nuclear reactor recirculation control portion 24.

A voltage source inverter is adapted for the inverter 10, 11 and 12, they are operated with a fixed voltage/frequency based on an inverter control signal from the inverter control portion so that the rotating speed of the PLR pump motor is controlled. In this instance, since the voltage source inverter is used, even if a turbine trip or a load rejection occurred, it is possible to deal with such trip or load rejection by shutting down the PRT breaker in the output side of the inverter. Therefore, the PLR pump motor can be tripped rapidly and safely by the stopping of the operation of the voltage source inverter.

Figure 2:
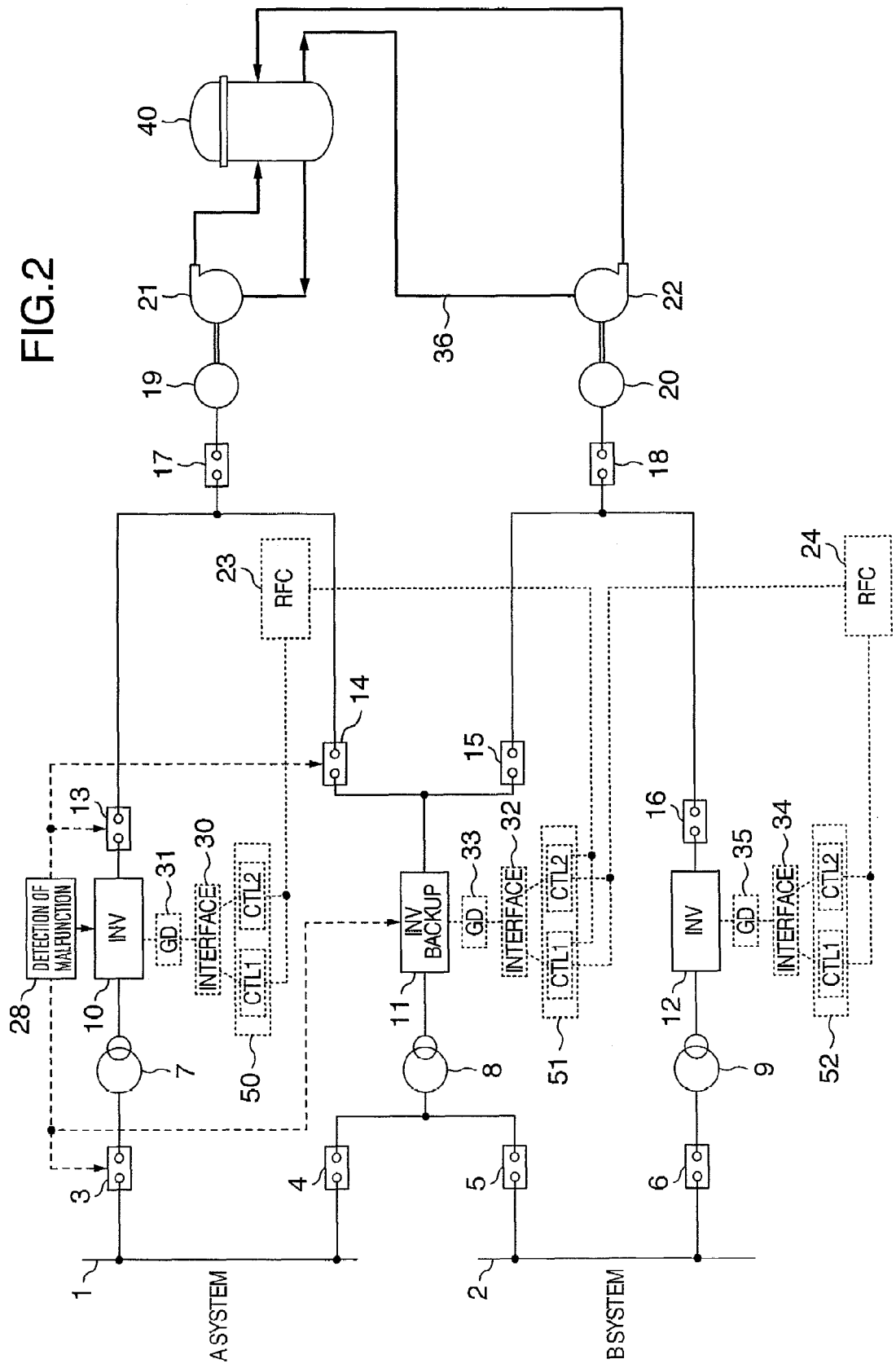
FIG. 2 is a general diagrammatic view illustrating a modified embodiment of the configuration of the adjustable speed drive for the primary loop recirculation pump according to the embodiment shown in FIG. 1.

FIG. 2 is a view showing a modified embodiment from the embodiment as shown in FIG. 1. The embodiment shown in FIG. 2 has a configuration similar to the embodiment shown in FIG. 1, however, an inverter control portions 50, 51, and 52 of the embodiment of FIG. 2 have a two-fold (i.e., dual) configuration. That is to say, each of the inverter control portions 50, 51, and 52 has two control portions, and each of the control portions are connected to the nuclear reactor recirculation control portion 23 and 24 respectively. By using this configuration, when a malfunction occurred in the control portion of the inverter control portions 50, 51, and 52 during the operation, it is possible to switch to a standby control portion of the inverter control portions 50, 51 and 52. Therefore, when a malfunction of any inverter control portion occurred, it is possible to take a measure of switching of control portion.

When a malfunction occurred in the adjustable speed drive main circuit portion, the adjustable speed drive main circuit portion is switched to the backup in a manner similar to the embodiment of FIG. 1, and thus the operation of the PLR pump motor can be continued.

Figure 3:
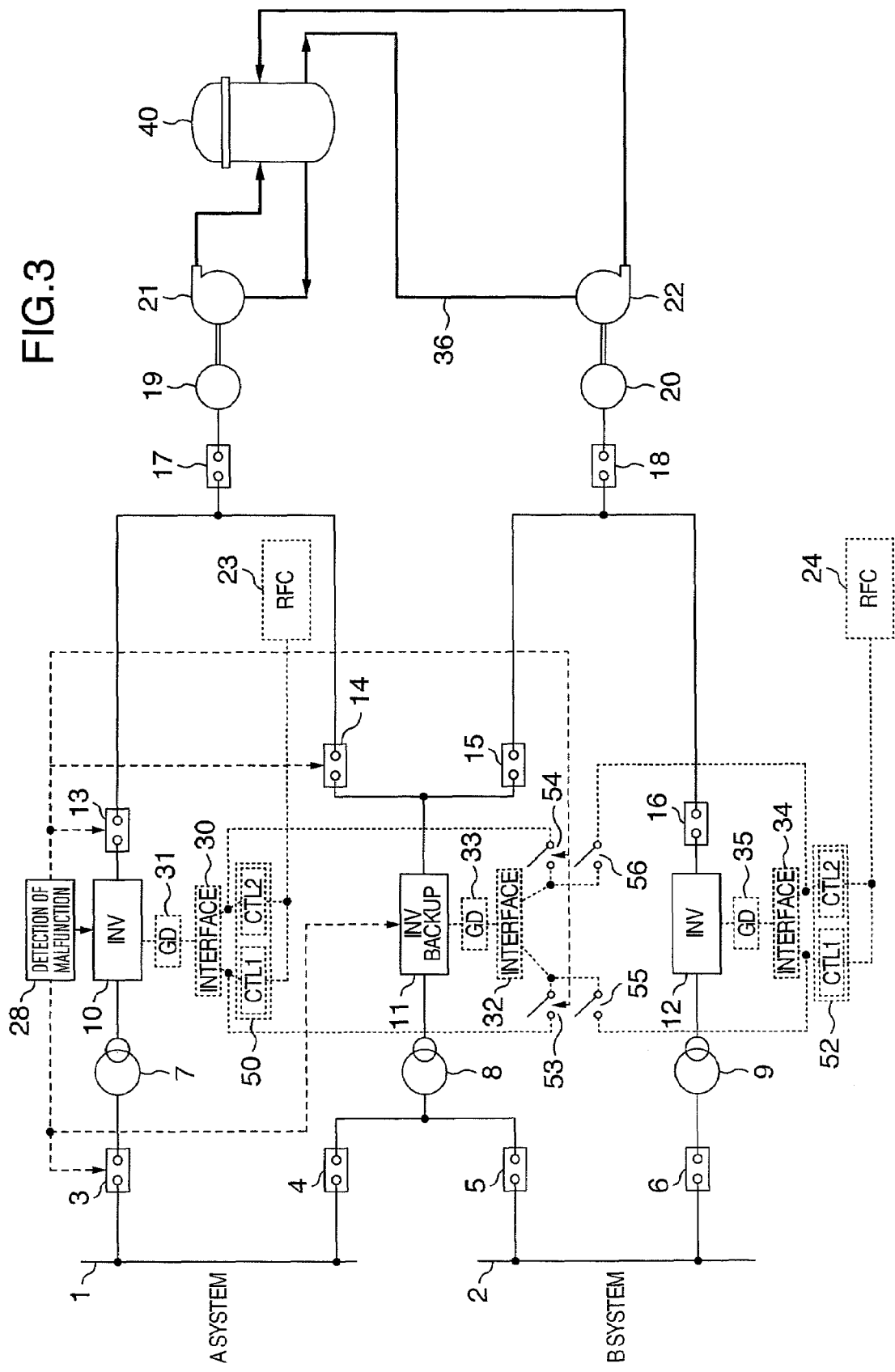
FIG. 3 is a general diagrammatic view illustrating a modified embodiment of the configuration of the adjustable speed drive for the primary loop recirculation pump according to the embodiment shown in FIG. 2.

FIG. 3 is a general view showing a modified embodiment from the embodiment shown in FIG. 2. In the embodiment shown in FIG. 3, instead of the backup inverter control portion 51 of the embodiment of FIG. 2, inverter control signal switches 53, 54, 55 and 56 are provided. Each control portion between an interface 30 and the two control portions of an inverter control portion 50 has a branch portion, and each of the branch portions are connected to a terminal of an inverter control signal switch 53 and a terminal of an inverter control signal switch 54 respectively. Further, each connection portion between an interface 34 and two control portions of an inverter control portion 52 has a branch portion, and each of the branch portions are connected to a terminal of an inverter control signal switch 55 and a terminal of an inverter control signal switch 56 respectively. The other terminal of the inverter control signal switch 53 and the other terminal of the inverter control signal switch 54 are connected to the interface 32 respectively. Further, a malfunction detection portion 28 is connected to the inverter control signal switch 53 and 54. When the inverter control signal switch 53 or the inverter control signal switch 54 is turned "on", a malfunction in a backup inverter 11 or a gate driver 33 can be detected via an interface 32.

In this embodiment, when if there is a malfunction in any of the inverter 10, the gate driver 31 or the interface 30, the malfunction detection portion 28 detects the malfunction, a breaker 13 is shut down to be opened, and a breaker 14 is put into its closed state. Subsequently, the inverter control signal switch for a control portion used by the inverter control portion 50 is turned "on" and the connection destination of the inverter control portion 50 is switched to the backup inverter 11 to continue controlling the PLR pump motor 19 by using the backup inverter 11. In this instance, an interlock is provided to the inverter control signal switch 53, 54, 55 and 56 to avoid they are turned to be closed at the same time.

By using this configuration, when a malfunction occurred in the adjustable speed drive main circuit portion, the backup inverter 11 can be controlled by making use of the inverter control portion in which the malfunction occurred, and thus the control and the operation of the PLR pump motor can be continued.

Figure 4:
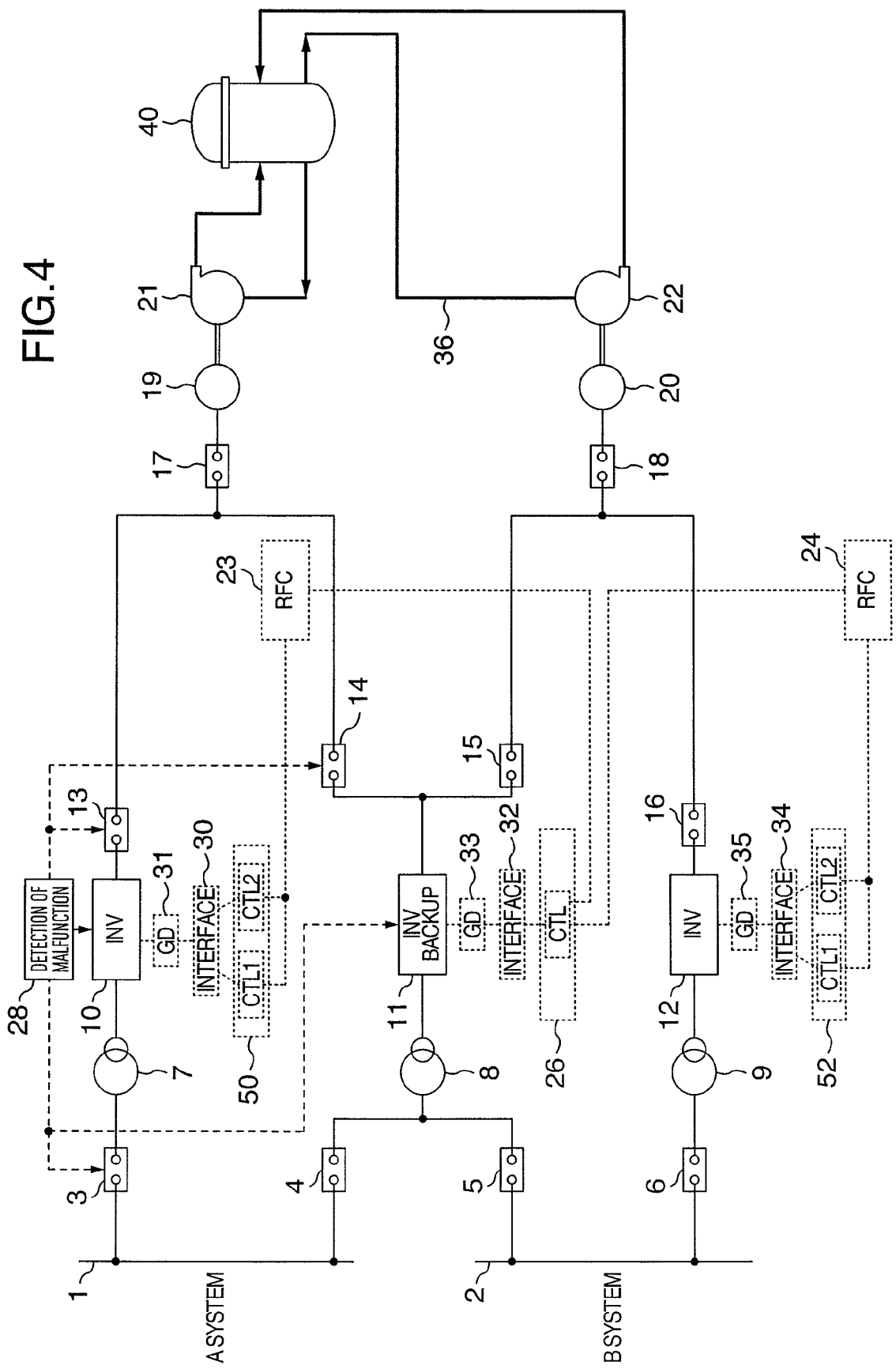
FIG. 4 is a general diagrammatic view illustrating a modified embodiment of the configuration of the adjustable speed drive for the primary loop recirculation pump according to the embodiment of FIG. 2.

FIG. 4 is a general view showing a modified embodiment from the embodiment shown in FIG. 2. The embodiment shown in FIG. 4 has a configuration similar to the embodiment shown in FIG. 2, however, a one-fold or single inverter control portion 26 is used for an inverter control portion of a backup inverter 11 in FIG. 4.

Figure 5:
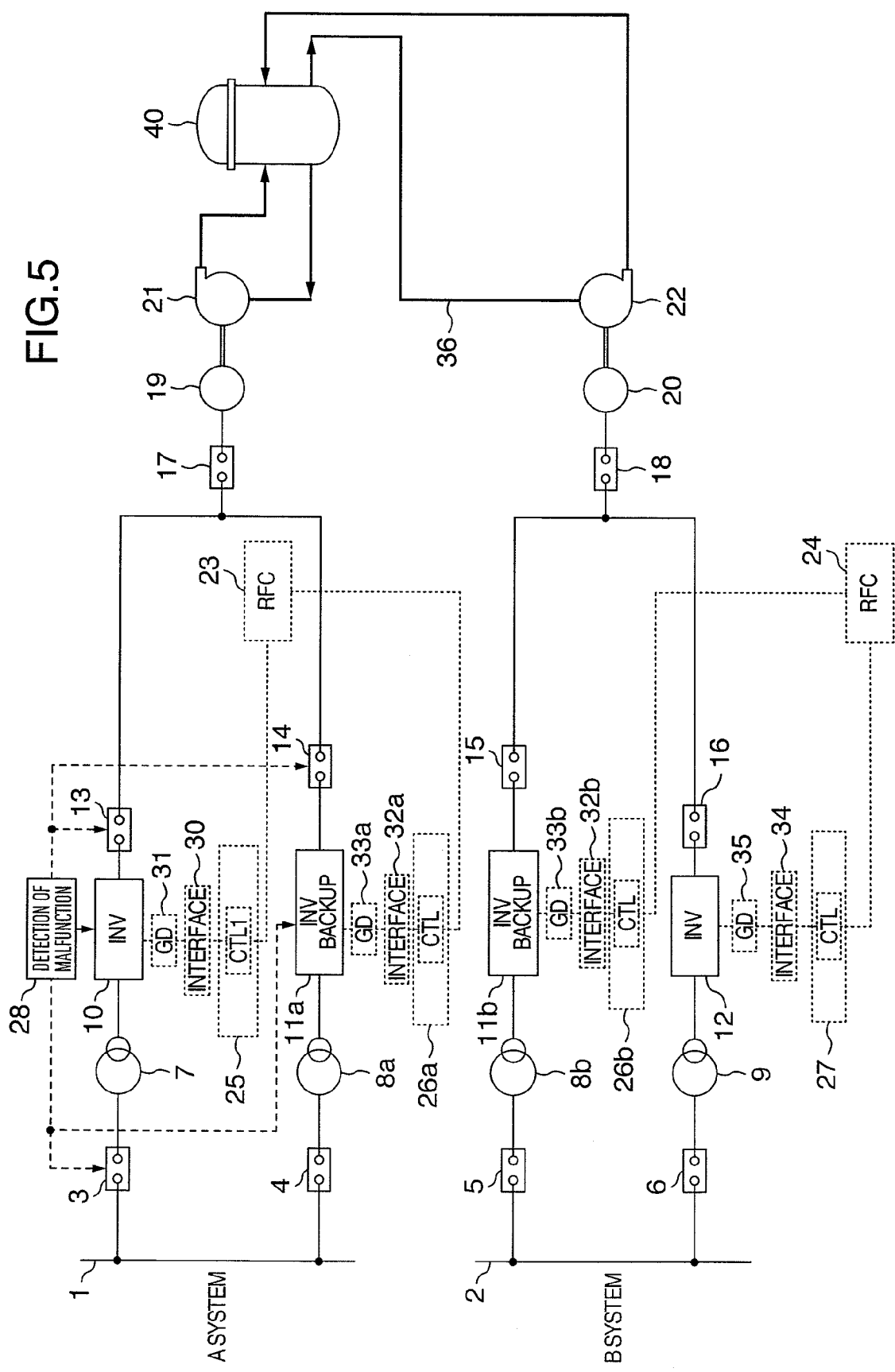
FIG. 5 is a general diagrammatic view illustrating a modified embodiment of the configuration of the adjustable speed drive for the primary loop recirculation pump according to the embodiment shown in FIG. 1.

FIG. 5 is a general view showing a modified embodiment of the embodiment shown in FIG. 1. An embodiment shown in FIG. 5 has a configuration similar to the example shown in FIG. 1. However, in the embodiment in FIG. 1, the high voltage buses 1 and 2 are connected via the breaker 4 and 5 to the shared transformer 8, but in FIG. 5, a high voltage bus 1 is connected to a transformer 8a via a breaker 4, and a high voltage bus 2 is connected to a transformer 8b via a breaker 5, so that a backup inverter 11 and an inverter control portion 26 are provided for each system.

That is, the high voltage bus 1 is connected to the transformer 8a via the breaker 4, and a backup inverter 11a, the breaker 14 and an RPT breaker 17 are connected to the transformer 8a in series. From a nuclear reactor recirculation control portion 23, an inverter control portion 26a, an interface 32a and a gate driver 33a are sequentially connected to the backup inverter 11a.

On the other hand, the transformer 8b is connected to the high voltage bus 2 via the breaker 5, and a backup inverter 11b, the breaker 15 and an RPT breaker 18 are connected to the transformer 8b in series. From the nuclear reactor recirculation control portion 24, an inverter control portion 26b, an interface 32b and a gate driver 33b are sequentially connected to the backup inverter 11b.

In the normal operation, a breaker 3 and a breaker 13 in the system of the high voltage bus 1 are closed, and electric power is supplied from an inverter 10 to a PLR pump motor 19. In this instance, the breaker 4 is closed, the breaker 14 is opened, the backup inverter 11a is in a standby state while being electrically charged, and an inverter control portion 26a is in a standby state following a signal from the nuclear reactor recirculation control portion 23. A breaker 6 and a breaker 16 in the system of the high voltage bus 2 are closed, and electric power is supplied from an inverter 12 to a PLR pump motor 20. In this instance, the breaker 5 is closed, the breaker 15 is opened, the backup inverter 11b is in a standby state while being electrically charged, and an inverter control portion 26b is in a standby state following a signal from the nuclear reactor recirculation control portion 24.

In this instance, for example, if a malfunction occurred in an adjustable speed drive circuit portion for supplying electric power to a PLR pump 21 which is in the high voltage bus 1 side, a malfunction detection portion 28 detects the malfunction, and the breaker 3 and the breaker 13 are shut down to be opened. Then, the inverter 10 is stopped, the backup inverter 11a is activated, and the breaker 14 is turned to be closed, so that the adjustable speed drive main circuit portion in the high voltage bus 1 side is switched to the backup to be able to continue the operation of the PLR pump motor 19.

Thus, since the backup inverter control portion and the adjustable speed drive main circuit portion are provided for each system of the high voltage bus, there is an advantage that switching control to the backup is facilitated.

Figure 6:
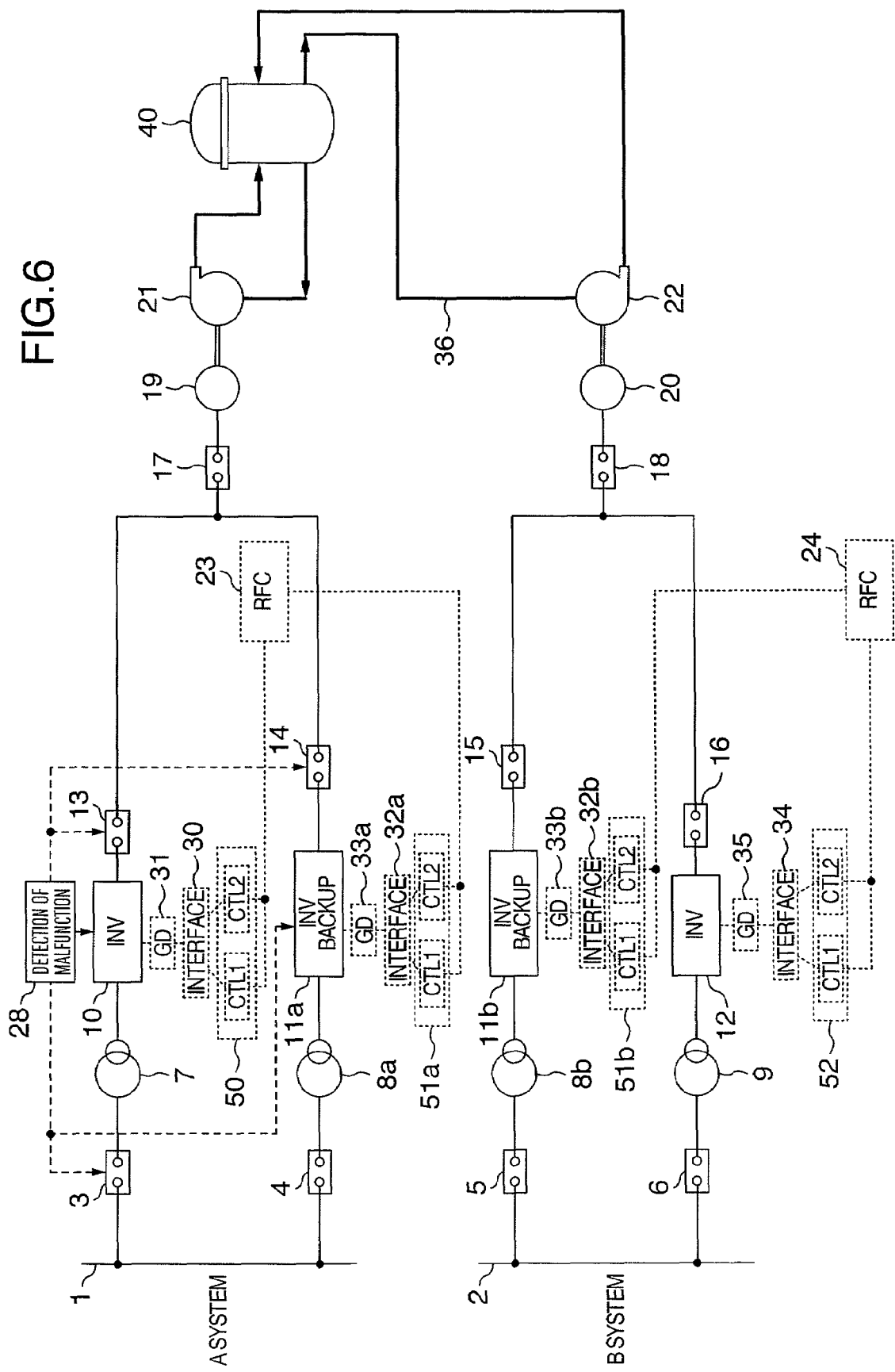
FIG. 6 is a general diagrammatic view illustrating a modified embodiment of the configuration of the adjustable speed drive for the primary loop recirculation pump according to the embodiment shown in FIG. 2.

FIG. 6 is a general view showing a modified embodiment from the embodiment shown in FIG. 2. An embodiment shown in FIG. 6 has a configuration similar to the embodiment shown in FIG. 2. However, in the embodiment of FIG. 2, the high voltage buses 1 and 2 are connected via the breakers 4 and 5 to the shared transformer 8, but in FIG. 6, a high voltage bus 1 is connected to a transformer 8a via a breaker 4, and a high voltage bus 2 is connected to a transformer 8b via a breaker 5, so that a backup inverter 11 and an inverter control portion 51 are provided for each system.

That is, the high voltage bus 1 is connected to the transformer 8a via the breaker 4, and a backup inverter 11a, the breaker 14 and an RPT breaker 17 are connected to the transformer 8a in series. From a nuclear reactor recirculation control portion 23, an inverter control portion 51a, an interface 32a and a gate driver 33a are sequentially connected to the backup inverter 11a.

On the other hand, the transformer 8b is connected to the high voltage bus 2 via the breaker 5, and a backup inverter 11b, the breaker 15 and an RPT breaker 18 are connected to the transformer 8b in series. From the nuclear reactor recirculation control portion 24, an inverter control portion 51b, an interface 32b and a gate driver 33b are sequentially connected to the backup inverter 11b.

In the normal operation, a breaker 3 and a breaker 13 in the system of the high voltage bus 1 are closed, and electric power is supplied from an inverter 10 to a PLR pump motor 19. In this instance, the breaker 4 is closed, the breaker 14 is opened, the backup inverter 11a is in a standby state while being electrically charged, and an inverter control portion 51a is in a standby state following a signal from the nuclear reactor recirculation control portion 23. A breaker 6 and a breaker 16 in the system of the high voltage bus 2 are closed, and electric power is supplied from an inverter 12 to a PLR pump motor 20. In this instance, the breaker 5 is closed, the breaker 15 is open, the backup inverter 11b is in a standby state while being charged, and an inverter control portion 51b is in a standby state following a signal from the nuclear reactor recirculation control portion 24.

In this instance, for example, if a malfunction occurred in an adjustable speed drive main circuit portion for supplying electric power to a PLR pump 21 which is in the high voltage bus 1 side, a malfunction detection portion 28 detects the malfunction, and the breaker 3 and the breaker 13 are shut down to be opened. Then, the inverter 10 is stopped, the backup inverter 11a is activated, and the breaker 14 is turned to be closed, so that the adjustable speed drive main circuit portion in the high voltage bus 1 side is switched to the backup system so as to be able to continue the operation of the PLR pump motor 19.

Thus, since the backup inverter control portion and the adjustable speed drive main circuit portion are provided for each system of the high voltage bus, there is an advantage that switching control to the backup system is facilitated.

FIG. 7 is a general view showing a modified embodiment from the embodiment shown in FIG. 6. The embodiment shown in FIG. 7 has a configuration similar to the embodiment shown in FIG. 6, however, a backup inverter control portion is omitted in the embodiment of FIG. 7. That is, each signal line which branches from each of connection portions between an interface 30 and two control portions of an inverter control portions 50 is connected to an interface 32a, and the inverter control portion 51a (FIG. 6) is omitted. Furthermore, each signal line which branches from each of connection portions between an interface 34 and two control portions of an inverter control portions 52 is connected to an interface 32b, and the inverter control portion 51b (FIG. 6) is omitted.

By using this configuration, if a malfunction occurred in the adjustable speed drive main circuit portion, the connection between the inverter control portion and the interface is switched to a backup side, and thus the control and the operation of the PLR pump motor can be continued.

FIG. 8 is a general view showing a modified embodiment from the embodiment shown in FIG. 6. The embodiment shown in FIG. 8 has a configuration similar to the embodiment shown in FIG. 6, however, a backup inverter control portion is a one-fold inverter control portion 26 in FIG. 8.

According to the embodiment of the present invention, the adjustable speed drive for the primary loop recirculation pump includes a backup adjustable speed drive main circuit portion, and a breaker for switching between an incoming destination and an outputting destination of the backup adjustable speed drive main circuit portion. A control signal of an inverter control portion is switched in order to control an inverter that is a constituent of the backup adjustable speed drive main circuit portion, and thus, even if a malfunction occurred in the adjustable speed drive main circuit, the primary loop recirculation pump of a nuclear reactor is continuously controlled and operated by switching to the backup adjustable speed drive main circuit portion.

Furthermore, since the backup adjustable speed drive is provided, if a malfunction occurred in the control portion, by performing switching of the adjustable speed drive main circuit control portion, even if the control portion is the one-fold configuration, it is possible to provide an adjustable speed drive for a primary loop recirculation pump which is highly reliable, has a redundancy, and of which cost and install space are reduced.

Furthermore, by controlling the backup inverter by using the control portion of the adjustable speed drive main circuit portion in which a malfunction occurred, it is not required to provide a backup inverter control portion, therefore it is possible to provide an adjustable speed drive for a primary loop recirculation pump of which cost and installation space are reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for controlling an adjustable speed drive system for a primary loop recirculation pump, having an adjustable speed drive systems provided with a first breaker connected to a high voltage bus of unit auxiliary power supply system, an inverter connected to the first breaker via a transformer, a second breaker connected to an output side of the inverter, a gate driver that supplies a gate pulse to the inverter, and an inverter control portion that drives the gate driver; the adjustable speed drive system being combined with a system of a backup adjustable speed drive system, the method comprising the steps of when a malfunction detection portion detects a malfunction in a main adjustable speed drive circuit portion including the inverter and the gate driver in the adjustable speed drive system used in a normal operation, switching the main adjustable speed drive circuit portion to the backup adjustable speed drive system, and continuing an operation of a recirculation pump motor for driving a recirculation pump that controls a flow of a reactor core.

2. A method for controlling an adjustable speed drive system for a primary loop recirculation pump, having two adjustable speed drive sets which are arranged in parallel, each of the two adjustable speed drive sets including an adjustable speed drive system and a backup adjustable speed drive system, wherein the adjustable speed drive system includes a first breaker connected to a high voltage bus of unit auxiliary power supply system, an inverter connected to the first breaker via a transformer, a second breaker connected to an output side of the inverter, a gate driver that supplies a gate pulse to the inverter, and an inverter control portion having two control portions that drive the gate driver, wherein the backup adjustable speed drive system includes a first breaker connected to a high voltage bus of unit auxiliary power supply system, an inverter connected to the first breaker via a transformer, a second breaker connected to an output side of the inverter, a gate driver for supplying a gate pulse to the inverter, and wherein the two control portions are connected to the gate driver of the backup adjustable speed drive system via an inverter control signal switch, the method comprising the steps of when a malfunction detection portion detects a malfunction in a main adjustable speed drive circuit portion including the inverter and the gate driver in one of the two adjustable speed drive sets used in a normal operation, switching the main adjustable speed drive circuit portion to the backup adjustable speed drive system, and continuing an operation of a recirculation pump motor for driving a recirculation pump that controls a flow of a reactor core.

3. The method according to claim 2, wherein the switching to the backup adjustable speed drive system includes switching the connection of the two control portions to the gate driver of the backup adjustable speed drive system.

4. An adjustable speed drive system for a primary loop recirculation pump, comprising: an adjustable speed drive system provided with a first breaker connected to a high voltage bus of unit auxiliary power supply system, an inverter connected to the first breaker via a transformer, a second breaker connected to an output side of the inverter, a gate driver that supplies a gate pulse to the inverter, and an inverter control portion that drives the gate driver; the adjustable speed drive system being combined with a system of a backup adjustable speed drive system to form a set of adjustable speed drive systems, wherein when a malfunction detection portion detects a malfunction in a main adjustable speed drive circuit portion including the inverter and the gate driver in the adjustable speed drive system used in a normal operation, the main adjustable speed drive circuit portion is switched to the backup adjustable speed drive system, and an operation of a recirculation pump motor for driving a recirculation pump that controls a flow of a reactor core is continued.

5. An adjustable speed drive arrangement for a recirculation pump for a reactor in a power plant, the arrangement comprising:
  two adjustable speed drive sets which are arranged in parallel, each adjustable speed drive set including a main adjustable speed drive system and a backup adjustable speed drive system,
  wherein the main adjustable speed drive system comprises a first breaker connected to a high voltage bus of an auxiliary power supply system; an inverter connected to the first breaker via a transformer; a second breaker connected to an output side of the inverter; a gate driver that supplies a gate pulse to the inverter; and an inverter control portion having two control portions that drive the gate driver,
  wherein the backup adjustable speed drive system includes a first breaker connected to a high voltage bus of an auxiliary power supply system; an inverter connected to the first breaker via a transformer; a second breaker connected to an output side of the inverter; a gate driver for supplying a gate pulse to the inverter wherein the two control portions are connected to the gate driver of the backup adjustable speed drive system, via an inverter control signal switch; and wherein a main control portion is provided to, when a malfunction occurs in a main adjustable speed drive circuit portion including the inverter and the gate drive in one of the two adjustable speed drive sets used during a normal operation, switch the main adjustable speed drive circuit portion to the backup adjustable speed drive system, and continue operation of a recirculation pump motor for driving a recirculation pump that controls a flow of a reactor core of the reactor.

6. The arrangement according to claim 5, wherein the switching to the backup adjustable speed drive system includes switching the connection of the two control portions to the gate driver of the backup adjustable speed drive system.

* * * * *